United States Patent
Coatantiec et al.

(10) Patent No.: US 12,098,922 B2
(45) Date of Patent: Sep. 24, 2024

(54) INERTIAL REFERENCE UNIT AND SYSTEM WITH ENHANCED INTEGRITY AND ASSOCIATED INTEGRITY-CHECKING METHODS

(71) Applicant: THALES, Courbevoie (FR)

(72) Inventors: Jacques Coatantiec, Valence (FR); Dominique Bouard, Valence (FR); Nicolas Vercier, Valence (FR)

(73) Assignee: THALES, Courbevoie (FR)

( * ) Notice: Subject to any disclaimer, the term of this patent is extended or adjusted under 35 U.S.C. 154(b) by 410 days.

(21) Appl. No.: 17/600,573

(22) PCT Filed: Apr. 3, 2020

(86) PCT No.: PCT/EP2020/059567
§ 371 (c)(1),
(2) Date: Sep. 30, 2021

(87) PCT Pub. No.: WO2020/201509
PCT Pub. Date: Oct. 8, 2020

(65) Prior Publication Data
US 2022/0178699 A1    Jun. 9, 2022

(30) Foreign Application Priority Data

Apr. 4, 2019    (FR) ........................ 1903610

(51) Int. Cl.
*G01C 21/00*    (2006.01)
*G01C 21/16*    (2006.01)
*G01C 25/00*    (2006.01)

(52) U.S. Cl.
CPC ........... *G01C 21/165* (2013.01); *G01C 25/00* (2013.01)

(58) Field of Classification Search
CPC ...... G01C 21/165; G01C 25/00; G01C 21/16; G01C 21/00; G06F 21/64
(Continued)

(56) References Cited

U.S. PATENT DOCUMENTS

| 5,297,052 A | 3/1994 | McIntyre et al. |
| 2008/0262729 A1 | 10/2008 | Bacon et al. |

(Continued)

FOREIGN PATENT DOCUMENTS

| EP | 3 012 586 A1 | 4/2016 |
| FR | 3 038 048 A1 | 12/2016 |

*Primary Examiner* — Shardul D Patel
(74) *Attorney, Agent, or Firm* — BakerHostetler (57) ABSTRACT

An inertial reference unit includes a first measurement channel that includes a first high-performance inertial measurement unit for measuring specific forces and angular velocities, a first computing unit able to compute pure inertial data based on the measurements of the first measurement unit; a second measurement channel that includes a second inertial measurement unit of performance lower than the first inertial measurement unit for measuring specific forces and angular velocities; a second computing unit able to compute pure inertial data based on the measurements of the second measurement unit; an integrity check function able to implement a method for checking the integrity of the data of the first measurement channel based and the second measurement channel; and a synchronization device for synchronizing the measurements.

22 Claims, 5 Drawing Sheets

(58) Field of Classification Search
USPC .......................................................... 701/512
See application file for complete search history.

(56) References Cited

U.S. PATENT DOCUMENTS

| | | |
|---|---|---|
| 2010/0152929 A1 | 6/2010 | Manfred et al. |
| 2011/0040430 A1* | 2/2011 | Tessier ................. G01C 21/183 |
| | | 701/3 |
| 2016/0107761 A1* | 4/2016 | Ahlbrecht ............... G01S 19/53 |
| | | 701/4 |

* cited by examiner

INERTIAL REFERENCE UNIT AND SYSTEM WITH ENHANCED INTEGRITY AND ASSOCIATED INTEGRITY-CHECKING METHODS

CROSS-REFERENCE TO RELATED APPLICATIONS

This application is a National Stage of International patent application PCT/EP2020/059567, filed on Apr. 3, 2020, which claims priority to foreign French patent application No. FR 1903610, filed on Apr. 4, 2019, the disclosures of which are incorporated by reference in their entirety.

FIELD OF THE INVENTION

The present invention relates to the field of assisting the piloting and/or navigation of an aircraft with electric flight controls, more specifically in the civil aviation sector.

The invention relates more specifically to the provision of an inertial reference unit and of an inertial reference system for an aircraft with electric flight controls, and to the checking of the integrity of said unit and of said system.

BACKGROUND

To pilot and/or navigate an aircraft, it is essential to know certain flight parameters of the aircraft. The flight parameters of an aircraft comprise notably ground-related parameters (or inertial references), and may also comprise air-related parameters (or air references).

The ground-related flight parameters may comprise altitude, attitudes (roll, pitch, heading), accelerations, velocities, notably angular velocities, etc.

Determination means for determining ground-related flight parameters comprise inertial units, also denoted "inertial reference systems" or "inertial systems" for short. An inertial reference system may be denoted "IRS" in acronym form. An IRS comprises one or more inertial reference units, each unit being denoted "IRU" in acronym form, or "URI". An IRU comprises an inertial measurement unit, denoted "IMU" in acronym form, or "UMI", as well as associated computers and sometimes a display. An IMU comprises inertial sensors, which are typically gyrometers and accelerometers.

The air-related flight parameters may comprise air speed, Mach number, vertical velocity, static pressure, total pressure, air temperature, etc.

Determination means for determining air-related flight parameters comprise anemo-barometric sensors as well as associated computers, the assembly forming an air data unit or "ADU".

An inertial unit that also makes it possible to determine air-related flight parameters is called an "ADIRS", which is the acronym for "Air Data Inertial Reference System". A corresponding inertial reference unit is denoted "ADIRU", which is the acronym for "Air Data Inertial Reference Unit".

The determined flight parameters are sent to user equipment on board the aircraft. The user equipment are for example control units for controlling engines or fins, and/or display systems for displaying flight parameters, for example in a cockpit of the aircraft.

For reasons of operational safety of the aircraft, it is recommended that the flight parameters be determined and displayed both by at least one primary inertial reference unit (which may be denoted "primary unit" throughout the present description) and by at least one standby inertial reference unit, which may also be denoted "secondary inertial reference unit", or "secondary unit" for short. A secondary unit makes it possible to provide redundancy for the primary unit, and is used notably in the event of failure of the primary unit. To bolster the operational safety of the aircraft, the primary unit and the secondary unit are preferably dissimilar. The term "dissimilar" denotes units that perform the same functions but that are different (for example different design, different hardware, etc.).

A standby inertial reference unit generally has a lower performance class than a primary unit.

A performance class (or performance level) of an inertial reference unit is defined according to the accuracy level of the equipment (at least the sensors) forming this unit, that is to say the accuracy level of the measurements delivered by said equipment.

A primary inertial reference unit generally consists of a dedicated housing in which sensors are arranged, as well as a computer and sometimes a display screen. The sensors form a high-performance inertial measurement unit (IMU), able to compute and display the flight parameters to the pilots, and to do so in such a way as to allow said pilot to safely pilot the aircraft (in what is called normal mode).

A standby inertial reference unit is generally an autonomous electronic equipment item, which may be denoted using the term "Standby" or the acronym "IESI" for "Integrated Electronic Standby Instrument". Such an instrument generally comprises a dedicated housing in which sensors, a computer and sometimes a display screen are arranged. In the same way as a primary unit, it makes it possible to display flight parameters and potentially a few other data independently of the primary unit, but delivered in a more summary manner and with a lower accuracy than for the primary unit. In the event of failure of the primary unit, the pilot uses the data displayed on the standby unit to pilot the aircraft. The display generally follows the same layout as that of the primary units.

The avionics architectures of aircraft with electric flight controls are usually based on one of the architectures known as "triplex" or "quadruplex", or on variants of these architectures.

Figure 1:
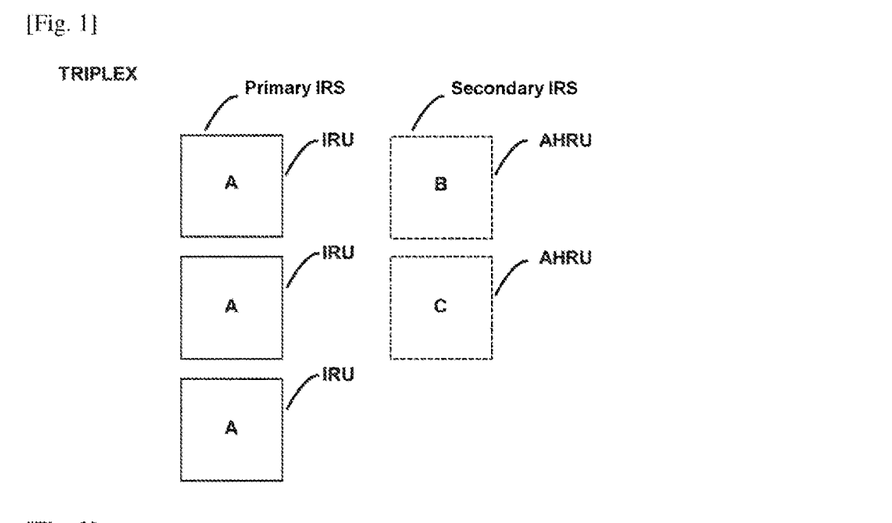
FIG. 1 shows a known "triplex" avionics architecture.

The triplex architecture illustrated in FIG. 1 is a system that comprises three primary units (A) of a high performance class and that are identical from a hardware and software point of view, as well as one or two secondary units (B or C), typically AHRUs (from the term "Attitude and Heading Reference Unit"), of a performance class lower than the primary units and that are dissimilar to the three primary units.

Figure 2:
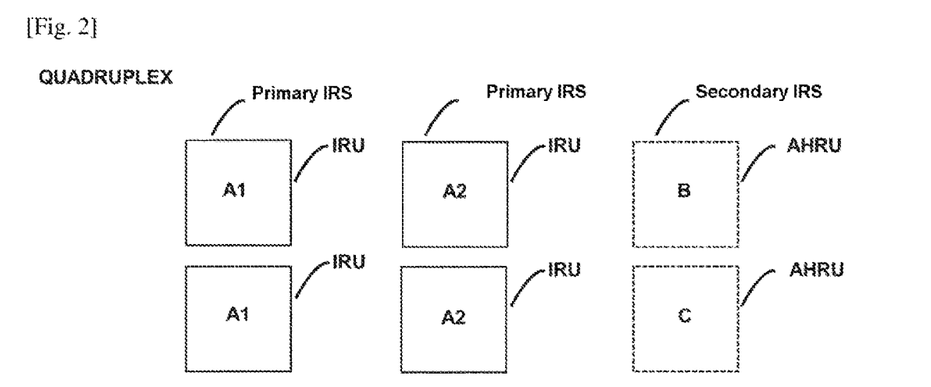
FIG. 2 shows a known "quadruplex" avionics architecture.

The quadruplex architecture illustrated in FIG. 2 is a system based on two first primary units (A1) of a high performance class and on two second primary units (A2) of a performance class lower than the two first primary units but sufficient to supply the flight controls, or of equivalent performance class. The two second primary units are preferably dissimilar to the two first primary units. A quadruplex architecture may comprise one or two secondary units (B or C), typically AHRUS of a performance class lower than the first and second primary units.

Although, from the points of view of integrity and continuity, the two triplex and quadruplex architectures offer substantially the same features in their nominal configuration, that is to say as long as no equipment declares itself to be faulty, some differences occur in the event of an aircraft taking off under "MMEL", that is to say with one equipment item detected as having failed, and then when, during the flight, a new failure occurs and is not detected by the built-in test module (also called "BIT" for "Built-In Test") of the faulty equipment. This second type of undetected failure is known as "Undetected Erroneous Data", and may be denoted "UED".

With a triplex architecture, since takeoff took place under MMEL, there are now only two primary units A. If a UED failure occurs in one of these two remaining units A, it is not known how to discern which units of these two units has failed. In other words, it is not known how to vote between the two units A. The flight controls abandon the normal piloting law and then switch to direct piloting law, that is to say the pilot has to resume piloting in manual mode using the information provided by the one or more standby units (B or C) and displayed on the instrument panel. In addition, such an architecture does not make it possible to detect a common-mode failure with the three primary units (or a common-mode failure with the two primary units under MMEL).

With a quadruplex architecture, takeoff under MMEL is less penalizing since there are still three primary units capable of supplying the flight controls (A1 and 2 A2 or 1 A2 and 2 A1). Thus, in the event of a failure affecting only one of the three primary units, it is easily possible to detect and exclude the erroneous unit, typically by way of an attitude consistency check. On the other hand, in the event of a second failure, this results in the same problem as with the triplex architecture upon a first failure under MMEL.

The quadruplex architecture does make it possible to better detect a common-mode failure with the primary units when there are two dissimilar types of primary unit. On the other hand, in the event of a common-mode failure, it does not make it possible to choose which primary unit is reliable. Specifically, if there is a dissimilarity between the first primary units A1 and the second primary units A2, this ends up with a 2 against 2 vote without being able to determine which units are reliable. The flight controls abandon the normal piloting law and switch to direct piloting law, that is to say the pilot has to resume piloting in manual mode using the information provided by the one or more standby units (B or C).

In addition, if there is no dissimilarity between the first primary units A1 and the second primary units A2, then it is not possible to detect a common-mode failure, this corresponding to a situation identical to that in the triplex architecture.

Triplex or quadruplex architectures therefore offer limited availability of the primary inertial information required for a normal flight control mode.

Some solutions have been able to be provided in order to improve the reliability of aircraft piloting and/or navigation assistance systems, these being described below.

U.S. Pat. No. 5,297,052 relates to an inertial reference and atmospheric data system comprising built-in redundancies for preventing a system failure in the event of failure of one or more components forming the system. Said system comprises a redundant main unit (an IRU or ADIRU), on the one hand, and a standby unit, on the other hand. The solution in that patent relates to redundancy in the main unit by increasing the number of high-performance sensors in an IRU or an ADIRU, typically 6 accelerometers and 6 gyrometers as well as 4 processor circuits operating in parallel. The processor circuits process and compare the outputs of the gyrometers and the accelerometers and transmit them to 3 voting circuits. The solution in U.S. Pat. No. 5,297,052 is to increase the number of high-performance sensors, thereby greatly increasing the price, weight and bulk of the system.

Patent application US2010152929 describes an aircraft inertial system comprising at least two inertial reference units (IRU) providing a first inertial signal dataset and at least two attitude heading reference units (AHRU), which are lower-performance standby units, providing a second inertial signal dataset, a primary flight display receiving the first and second inertial signal datasets, and a standby flight display receiving at least the second inertial signal dataset. During operation, at least some of the inertial signal data from at least two AHRUs is compared with the inertial signal data provided by the at least two IRUs. When a single fault occurs, the primary flight display continues to operate with operational redundancy on at least three units from among the IRUs and AHRUs, and the standby flight display operates using a unit other than the primary in-flight display. Since it is indicated that the AHRUs are dissimilar to the IRUs, but that the IRUs are not dissimilar to one another and that the AHRUs are not dissimilar to one another, there is still a risk of common-mode failure, despite the redundancy. In reality, this system is similar to a quadruplex system, but in which the primary units A2 are replaced with secondary units. It therefore retains the same drawbacks. In addition, patent application US2010152929 mainly targets the display of data in the event of a fault. The pilot therefore moves to direct piloting law. Finally, the data that are compared are attitudes. However, since the attitudes provided by AHRUs may exhibit very large errors, the comparison thresholds are necessarily high.

Patent application US20080262729 relates to a method for implementing a fault-tolerant avionics architecture that comprises three or four non-fault-tolerant inertial measurement units, that is to say high-performance inertial measurement units, and a standby inertial measurement unit, all of these units being physically separate but all being coupled to a processor. Each high-performance inertial measurement unit comprises a triad of accelerometers and/or gyrometers, that is to say three accelerometers and/or three gyrometers. The processor is able to detect a first and then a second failure of a high-performance inertial measurement unit on the basis of a threshold that is computed based on expected performance during a parity check, is able to suspend the operation of the failed inertial measurement unit, and then operate the standby inertial measurement unit with the non-failed high-performance inertial measurement units in order to continue tracking the vehicle. It may continue to use parity logic to monitor the functionality of the system. The parity method consists in comparing measurements from redundant sensors (in this case the redundant sensors between the various high-performance inertial measurement units), and in applying a mathematical formula to the differences between said measurements (typically, the squares of the differences are added) and then in checking whether the result of this formula follows a typical noise probability law. If it does not follow the expected law, a failure or a bias is deduced therefrom. In that patent application, the number of triads of sensors is increased, thereby increasing the price, weight and bulk of the system. In addition, the parity method is not the most efficient method for comparing a high-performance inertial measurement unit with a standby inertial measurement unit in this architecture. Finally, the computations are performed assuming that the vehicle supporting the inertial measurement units is rigid enough not to cause any significant differences in the velocities detected at the various locations of the inertial measurement units. This therefore puts a constraint on the vehicle. If it is not, this requires raising the parity error detection thresholds.

Patent FR3038048 describes an inertial measurement system for an aircraft, comprising an inertial unit of a first type comprising at least three angular sensors and three linear sensors that are aligned on three separate sensitive axes, an inertial unit of a second type comprising at least four angular sensors and four linear sensors that are aligned on four separate sensitive axes, this second unit being configured so as to be able to monitor itself autonomously (without the first unit in particular), and a processing unit connected to the units. The system is designed to compute, in a conventional manner, an item of inertial data from the three angular sensors and from the three linear sensors of the first inertial unit. In addition, from the second unit, it is possible to obtain four items of inertial data from four separate combinations of three angular sensors and three linear sensors selected from among the sensors of the inertial unit of the second type; the processing unit is designed to compare the four items of inertial data with one another so as to determine whether the inertial unit of the second type is faulty. In that patent application, the number of sensors is increased, thereby greatly increasing the price, weight and bulk of the system. In addition, the aspect of processor failure is not dealt with; in other words, if there is a processor failure, there is no redundant processor able to take over. More broadly, the system described in patent FR3038048 does not take into account common-mode failures, etc.

SUMMARY OF THE INVENTION

One aim of the invention is to propose an avionics system for assisting the piloting and/or navigation of an aircraft with electric flight controls that makes it possible to improve the checking of the integrity of the flight parameters that are provided.

More specifically, the invention aims to more accurately and more quickly identify a failure of and/or drift on a primary inertial reference unit. The invention thus aims to provide an inertial reference unit capable of performing self-monitoring.

In addition, for a system comprising a plurality of inertial reference units, the invention aims to determine the one or more defective inertial reference units (and conversely the one or more reliable inertial reference units), or even to rectify a failure and/or drift of the one or more defective inertial reference units. The invention aims in particular to prevent the electric flight controls from switching to direct mode.

Another aim of the invention is to avoid common-mode failures on an inertial reference unit and/or an avionics system.

It would be advantageous for the invention to achieve these aims without complicating, without overburdening and/or without increasing the cost of the inertial reference unit, and therefore that of the avionics system.

DISCLOSURE OF THE INVENTION

A first subject of the invention relates to an inertial reference unit for providing and monitoring flight parameters of an aircraft, comprising:
  a first measurement channel comprising:
    a first high-performance inertial measurement unit comprising first measurement means for measuring specific forces and first measurement means for measuring angular velocities, and
    a first computing unit coupled to the first inertial measurement unit and comprising a first inertial processing function able to compute pure inertial data based on the measurements of said first measurement unit;
  a second measurement channel comprising:
    a second inertial measurement unit of performance lower than the first inertial measurement unit and comprising second measurement means for measuring specific forces and second measurement means for measuring angular velocities, and
    a second computing unit coupled to the second inertial measurement unit and comprising a second inertial processing module able to compute pure inertial data based on the measurements of said second measurement unit;
  an integrity check function able to implement a method for checking the integrity of the data of the first measurement channel based on the data provided by the second measurement channel; and
  a synchronization means for synchronizing the measurements of the first and second inertial measurement units;
the first and second inertial measurement units being mechanically mounted fixedly with one another in the inertial reference unit.

According to one advantageous embodiment, the inertial reference unit furthermore comprises provision means for providing vertical information to the integrity check function, and the integrity check function is able to implement a method for checking the integrity of the data of the first measurement channel based on the data provided by the second measurement channel and on said vertical information. This makes it possible to refine the integrity check, and notably to detect low-amplitude gyrometer failures.

According to one particular embodiment, the vertical information that is provided is a vertical position, a vertical velocity or a vertical acceleration.

According to one embodiment, the second inertial measurement unit is of medium or low performance, preferably of low performance.

According to one embodiment, the first and second measurement means for measuring specific forces comprise accelerometers, preferably one accelerometer per axis.

According to one embodiment, the first and second measurement means for measuring angular velocities comprise gyrometers, preferably one gyrometer per axis.

According to one embodiment, the first measurement channel comprises a first power supply unit and the second measurement channel furthermore comprises a second power supply unit.

A second subject of the invention relates to a method for checking the integrity of an inertial reference unit according to the first subject of the invention, and more specifically of the first measurement channel of an inertial reference unit, said method being implemented in the integrity check function for checking the integrity of said inertial reference unit and comprising the following steps:
  a first step of providing a consolidated item of inertial data originating from the second measurement channel;
  a second step of determining a first comparison value between an item of inertial data originating from the first measurement channel and a consolidated item of inertial data originating from the second measurement channel;

a third step of comparing the first comparison value with a first threshold, a value greater than said first threshold making it possible to detect a lack of integrity of the first measurement channel.

An item of data is said to be "consolidated" when it has been verified, notably when the measurement unit for delivering the item of data performed self-monitoring, and/or when it has been corrected.

According to one embodiment, the method furthermore comprises a step of synchronizing the measurements between the first and second measurement units of the inertial reference unit.

According to one embodiment, the method furthermore comprises a preliminary self-monitoring step in static alignment mode of the first inertial measurement unit and/or of the second inertial measurement unit, so as to provide a consolidated item of inertial data originating from the second measurement channel.

Self-monitoring in static alignment mode is a method known to those skilled in the art in the field of the invention. It is nevertheless specified that such a preliminary self-monitoring step in static alignment mode consists in using the fact that the aircraft is at a standstill by integrating sensor increments (accelerometers and gyrometers) in this state of the aircraft in order to deduce a velocity therefrom, and this velocity, which should be zero, expresses the errors of the sensors. For example, with knowledge of the maximum error limit of the sensors (a priori information), typically through a Kalman filter, it is possible to estimate the maximum error limit in the velocity and to compare it with the measured velocity. If this measured velocity is beyond the threshold found using the Kalman filter, it is possible to deduce therefrom drift of the inertial unit.

According to one embodiment, the first step comprises a step of correcting the item of inertial data originating from the second measurement channel so as to obtain a consolidated item of inertial data.

According to one particular embodiment, the correction step is performed using an item of inertial data originating from the first measurement channel, for example by applying a first filter to the difference between the item of inertial data originating from the second measurement channel and the item of inertial data originating from the first measurement channel, said correction step being offset in time from the second step. Such a step of correcting the item of inertial data originating from the second measurement channel is preferably performed before the second determination step.

According to one particular embodiment, the correction step comprises a step of removing a bias from the item of inertial data originating from the second measurement channel, said bias being constant for a given bias time, the second step being performed in said bias time.

According to one particular embodiment, the first comparison value is obtained by applying a second filter to the difference between the corrected item of inertial data originating from the second measurement channel and the item of inertial data originating from the first measurement channel, the period of the filter being less than the bias time; and the third step consists in comparing the result of the second filter with the first threshold.

According to one embodiment, the compared items of inertial data are attitude, angular velocity, specific force and/or acceleration data.

According to one embodiment, the method furthermore comprises:
a fourth step of determining a second comparison value between a vertical acceleration computed based on inertial data originating from the first measurement channel and vertical information provided to the integrity check function, the vertical information being for example a measured vertical position or a measured vertical velocity, said vertical information being transformed beforehand into vertical acceleration, or a measured vertical acceleration;
a fifth step of comparing the second comparison value with a second threshold, a value greater than said second threshold making it possible to detect a lack of integrity.

According to one particular embodiment, the second comparison value is obtained by applying a third filter to the difference between the computed vertical acceleration and the vertical acceleration resulting from the vertical information; and the fifth comparison step consists in comparing the result of the third filter with the second threshold.

A third subject of the invention is an avionics system for assisting the piloting and/or navigation of an aircraft, comprising at least two inertial reference units according to the first subject of the invention and at least one comparison computer able to compare an item of inertial data delivered by a first inertial reference unit and an item of inertial data delivered by a second inertial reference unit.

According to one embodiment, the system comprises three inertial reference units according to the first subject of the invention.

According to another embodiment, the system comprises two inertial reference units according to the first subject of the invention and two other inertial reference units.

According to one embodiment, the system furthermore comprises a measurement means for measuring vertical information, for example a barometric altimeter, a radio altimeter, a vertical accelerometer, a vertical velocity probe.

A fourth subject of the invention is a method for checking the integrity of an avionics system, and more specifically of an inertial reference unit, said method comprising:
a first step of comparing an item of inertial data delivered by a first inertial reference unit and an item of inertial data delivered by a second inertial reference unit, so as to determine a failure of an inertial reference unit; and, if the first step does not make it possible to discriminate the failed inertial reference unit,
a second step of implementing the integrity checking method according to the second subject of the invention for at least one inertial reference unit according to the first subject of the invention.

An item of data is defined as the value, delivered at a time t, of a parameter. An item of pure inertial data is thus the value, delivered at a time t, of one of the following parameters: an attitude (heading, roll, pitch), an angular velocity, a specific force, an acceleration, a velocity, a position, etc. When comparing two items of data with one another, those skilled in the art will understand that this involves comparing two items of data of the same parameter or two parameters of which at least one is suitable for being compared with the other.

According to the invention, an inertial measurement unit is of high performance if it is able to provide an attitude with an error less than or equal to 0.2°; of medium performance if it is able to provide an attitude with an error greater than 0.2° and less than 1°, and of low performance if it provides an attitude with an attitude error greater than or equal to 1°, for example between 2 and 5°. A high-performance inertial reference unit is able to find its heading autonomously.

The principle of the invention is that, within the same inertial reference unit, a secondary inertial measurement unit of performance lower than that of the primary inertial measurement unit, which is of high performance, is capable of monitoring the primary inertial measurement unit, possibly additionally using vertical information that is measured outside the inertial measurement units. The inertial reference unit comprises a check function suitable for performing this monitoring. The inertial reference unit is thus capable of performing self-monitoring.

Unlike solutions in which an inertial system comprises (high-performance) primary inertial reference units and (medium-performance or low-performance) secondary inertial reference units that are able to monitor one another, the invention makes it possible to provide a high-performance inertial reference unit that is able to perform self-monitoring, this having the advantage of reduced bulk, weight and cost.

The invention consists in combining, in the same inertial reference unit, high-performance sensors with lower-performance (and therefore less expensive and less heavy) sensors, or even in using other sensors and/or data available in the aircraft, and the check function consists in suitable processing of the data delivered by the sensors and/or of the data available to monitor the primary inertial measurement unit.

The check function may be parameterized such that it is guaranteed that it will be possible to detect and identify a failure and/or drift before the attitudes reach a maximum limit required by an operator, typically of a few degrees.

Another advantage of the inertial reference unit according to the invention is its ability to provide inertial data that are ordinarily provided by an IESI ("Integrated Electronic Standby Instrument") standby inertial reference unit. This thus makes it possible to eliminate the inertial portion of the IESI.

BRIEF DESCRIPTION OF THE DRAWINGS

Other features and advantages of the invention will become apparent through the following description given by way of non-limiting illustration, provided with reference to the appended figures, in which:

FIG. 5A and

DETAILED DESCRIPTION

FIGS. 1 and 2 have been described further above and will not be repeated here.

The invention relates to an inertial reference unit for providing and monitoring flight parameters of an aircraft.

Figure 3:
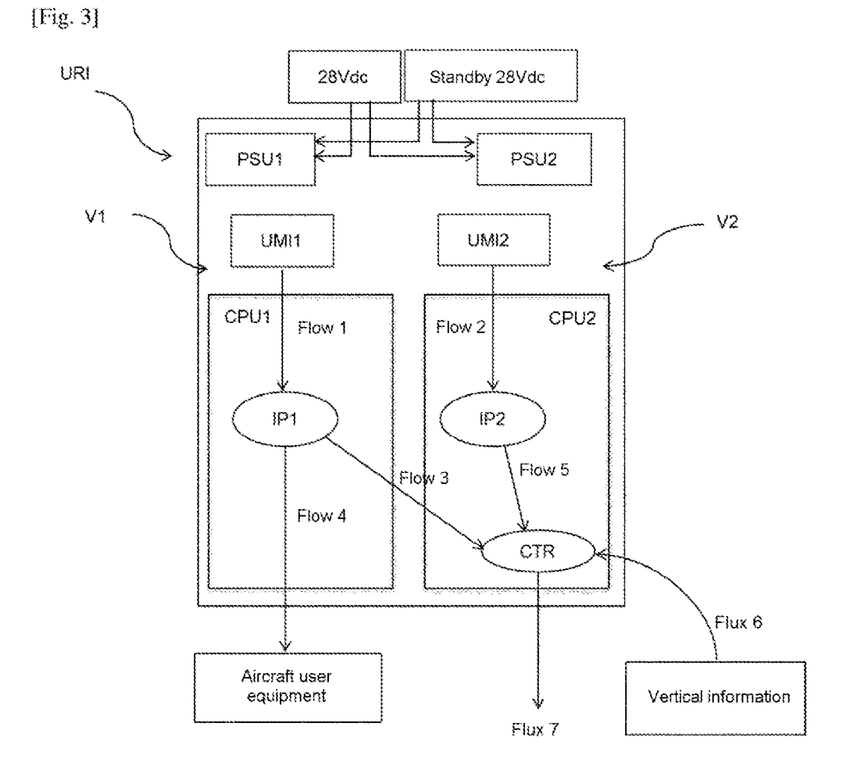
FIG. 3 illustrates one example of an inertial reference unit according to the invention.

FIG. 3 shows one example of an inertial reference unit according to the invention.

The illustrated inertial reference unit, denoted URI, is formed of:

a first measurement channel V1 comprising:
  a first high-performance inertial measurement unit UMI1 that comprises first measurement means for measuring specific forces and first measurement means for measuring angular velocities;
  a first computing unit CPU1 coupled to the first inertial measurement unit and comprising a first inertial processing function IP1 able to compute pure inertial data based on the information of the first measurement unit, and
  a first power supply unit PSU1 capable of receiving at least two power supply inputs, for example two 28 V inputs (a main power supply and a standby or "backup" power supply);

a second measurement channel V2 comprising:
  a second inertial measurement unit UMI2 of performance lower than the first inertial measurement unit, for example of medium or low performance, and which comprises second measurement means for measuring specific forces and second measurement means for measuring angular velocities;
  a second computing unit CPU2 coupled to the second inertial measurement unit and comprising a second inertial processing function IP2 able to compute pure inertial data based on the information of the second measurement unit, and
  a second power supply unit PSU2 capable of receiving at least two power supply inputs, for example two 28 V inputs (a main power supply and a standby or "backup" power supply);

an integrity check function CTR, able to implement a method for checking the integrity of the first inertial measurement channel V1 based on the inertial data provided by the second measurement channel V2 and possibly on vertical information; and provision means for providing vertical information to the integrity check function CTR;

the first and second inertial measurement units being mechanically mounted fixedly with one another in the inertial reference unit so as to measure the same movements.

The inertial reference unit furthermore comprises a synchronization means for synchronizing the measurements of the first and second inertial measurement units, which may be a computing block installed in the first or the second computing unit, or implemented in the check function.

In particular, the integrity check function CTR is able to implement a method for checking the integrity of the first inertial measurement unit UMI1.

In the example illustrated, the inertial reference unit comprises a housing, and the first and second inertial measurement units are mechanically mounted fixedly in said housing.

The first inertial processing function IP1 (respectively the second inertial processing function IP2) is installed in the first computing unit CPU1 (respectively in the second computing unit CPU2).

In the example illustrated, the integrity check function CTR is installed in the housing of the inertial reference unit URI, and more specifically in the second computing unit CPU2. Specifically, given that the integrity check function has to provide integrity information of the first measurement channel V1, it is desirable for it not to be installed in said measurement channel to be checked.

As an alternative, a first integrity check function may be installed in the first computing unit CPU1 and a second check function may be installed in the second computing unit CPU2. The first and second integrity check functions are able to communicate with one another. This also makes it possible to check for a potential failure of the computer CPU2 when a failure has already been detected on the first inertial measurement channel.

More generally, the inertial reference unit URI may comprise a plurality of integrity check functions that are able to communicate with one another.

The first and second computing units may be embedded cards comprising a microprocessor. In particular, the choice of the first computing unit (robustness, integrity, resolution, etc.) is preferably based on the performance of the first measurement unit.

The first and second computing units, and notably the first and second inertial processing functions, are preferably dissimilar.

The vertical information may be a vertical position, a vertical velocity or a vertical acceleration. Among the sensors able to measure such information, mention may be made of barometric altimeters, radio altimeters, vertically accurate accelerometers and vertical velocity probes. Such sensors are generally not arranged in the inertial reference unit, but are positioned in suitable locations on the aircraft. If the inertial reference unit is an ADIRU, that is to say with aerodynamic data, then such sensors are coupled to the inertial reference unit.

The provision means for providing the vertical information are for example Arinc429 or Arinc664 links or specific buses. It is specified that said provision means for providing vertical information are transmission means for transmitting said information to the integrity check function CTR, and therefore form part of the inertial reference unit URI. They should be differentiated from the measurement means for measuring this information, such as the sensors described above, which are generally not integrated into the URI.

Preferably, the vertical information is considered to be consolidated upstream, that is to say that it may be used without needing to check it.

The second inertial measurement unit has preferably performed self-monitoring, notably in alignment mode, before the provided data are used. Self-monitoring is advantageously performed when the aircraft is static, typically on the ground.

Likewise, the first inertial measurement unit has preferably performed self-monitoring beforehand. It may notably send the second inertial measurement unit the information that the aircraft is static, thus allowing said second inertial measurement unit to initiate its self-monitoring.

Furthermore, since the provision means able to provide vertical information, the first measurement unit and the second measurement unit are generally dissimilar, a common-mode failure is avoided. Plus, in addition, the probability of simultaneously having at least two failed equipment items from among the vertical information, the first inertial measurement unit and the second inertial measurement unit is very low and less than the desired probability of undetected failure.

In the example illustrated, each inertial measurement unit comprises three accelerometer sensors providing the specific forces and three gyrometer sensors providing the angular velocities. As an alternative, the sensors may be gyroscopes instead of gyrometers.

According to the example illustrated, the flows flowing between the units and/or the functions are as follows:

Flow 1 (between UMI1 and IP1): clock of UMI1, UMI1 gyrometer increments, UMI1 accelerometer increments, status information of the gyrometer and accelerometer increments of UMI1;

Flow 2 (between UMI2 and IP2): clock of UMI2, UMI2 gyrometer increments, UMI2 accelerometer increments, status information of the gyrometer and accelerometer increments of UMI2;

Flow 3 (between IP1 and CTR): pure inertial data of the first measurement channel, notably attitudes (roll R1, pitch T1, heading C1), specific forces, angular velocities, estimated gravity, Coriolis force computed in IP1 based on the data transmitted in flow 1;

Flow 4 (at the output of IP1 to the user equipment of the aircraft): pure inertial data of the first measurement channel, notably attitudes (roll R1, pitch T1, heading C1) computed in IP1 based on the data transmitted in flow 1, and which have to be identical to the attitudes C1, R1, T1 transmitted in flow 3;

Flow 5 (at the output of IP2 to CTR): pure inertial data of the second measurement channel, notably attitudes (roll R2, pitch T2, possibly heading C2), specific forces, angular velocities computed in IP2 based on the data transmitted in flow 2;

Flow 6 (to CTR): transmission of vertical information;

Flow 7 (at the output of CTR): pure inertial data of the first measurement channel V1 with consolidation status transmitted by the check function CTR, pure inertial data of the second measurement channel V2.

The flows flow between the units and/or the functions, for example Arinc429 or Arinc664 links or specific buses.

The user equipment are for example control units for controlling engines or fins, display systems for displaying flight parameters, for example in a cockpit of the aircraft, or other inertial reference units.

The data associated with the flows preferably contain a digital data check mechanism such as a CRC (for "Cyclic Redundancy Code"). Although there are means other than the CRC for digitally checking the data, such as for example a checksum, such a check will be denoted using the term CRC for short. A CRC may be performed for a group of data or for each item of data taken separately. If the CRC does not match the data, the data are invalidated by the user. This makes it possible to check for the corruption of an item of data on a link.

The data may also be functionally invalidated. For example, if the specific force is computed beyond a reasonable threshold, it may be invalidated. Each item of data has a validity, and this item of data may be invalidated notably by a CRC check, but also by other checks.

The invention also relates to a method for checking the integrity of the first measurement channel of the inertial reference unit, two examples of which are given below. The integrity checking method may be in the form of an algorithm. For this reason, said method illustrated in FIG. 4 may be referred to hereinafter as "check algorithm".

Figure 4:
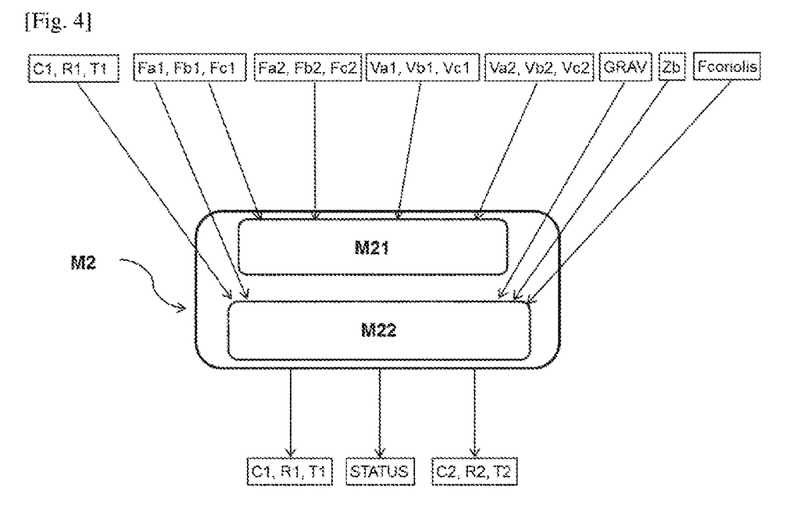
FIG. 4 illustrates an algorithm for checking an inertial reference unit according to the invention.

The integrity check function CTR is able to implement the method according to the invention for checking the integrity of the first measurement channel of the inertial reference unit, and in particular the integrity of the first inertial measurement unit.

More specifically, the integrity check function is able to implement the integrity checking method, which comprises the following steps:

a first step of providing a consolidated item of inertial data originating from the second measurement channel;

a second step of determining a first comparison value between an item of inertial data originating from the first measurement channel and a consolidated item of inertial data originating from the second measurement channel;

a third step of comparing the first comparison value with a first threshold, a value greater than said first threshold making it possible to detect a lack of integrity.

Description of a First Example of a Check Algorithm (M2).

The inputs of the described check algorithm are as follows:

the attitudes (heading C1, roll R1, pitch T1) computed by IP1 and present in flow 3;

the specific forces measured by UMI1, denoted Fa1, Fb1, Fc1 (along the three axes of UMI1) and present in flow 3;

the estimated gravity GRAV: this may be associated with the position estimated by IP1 and be present in flow 3; possibly the Coriolis force $F_{Coriolis}$;

vertical information, for example an altitude or vertical position denoted Zb, provided in flow 6;

the angular velocities measured by UMI1, denoted Va1, Vb1, Vc1 (along the three axes of UMI1) and provided by IP1 in flow 3;

the specific forces measured by UMI2 and provided by IP2 in flow 5 (their projections in the reference frame of UMI1 are denoted Fa2, Fb2, Fc2);

the angular velocities measured by UMI2 and provided by IP2 in flow 5 (their projections in the reference frame of UMI1 are denoted Va2, Vb2, Vc2).

The projections, in the geometrical reference frame of UMI1, of the angular velocities and of the specific forces measured by UMI2 may be performed in the second computing unit CPU2 or in the check function CTR (in this case, they are not input data) or else in another suitable function. These projections are made possible and reliable since the two measurement units UMI1 and UMI2 are mechanically mounted fixedly in the URI, and there is therefore no deformation between said measurement units.

The gravity GRAV may be estimated based on the position provided by IP1 using known and published models (Somigliana, Cassinis, Jeffreys, Welmec etc. models). It is preferably computed in IP1. As an alternative, it may be computed in the check function CTR (in this case, it is not an item of input data), which requires providing the check function with the position provided by the first computing unit, or in another suitable function.

Each item of data is preferably provided with a validity index, for example "YES" (valid), "NO" (invalid) or "WITHOUT" (no index provided).

The outputs of the check algorithm (flow 7) are as follows:

the pure inertial data of the first measurement channel, comprising at least attitudes (heading C1, roll R1, pitch T1) provided with their validity indices (the same data as those present in flow 4);

a check status of the pure inertial data of the first measurement channel, for example: "OK", "KO" or "not done";

the pure inertial data of the second measurement channel, comprising at least attitudes (roll R2, pitch T2, possibly heading C2) provided with their validity indices (the same data as those present in flow 5).

If an item of data is provided with an invalidity index, the consolidation status is preferably identified as "not done".

The presented check algorithm, denoted M2, is formed of two independent blocks M21 and M22 that are executed in each cycle of computing the input data. The period of a cycle $T_{cycle}$ may be of the order of a few milliseconds, for example 10 ms.

The first block M21 detects high-amplitude gyrometer failures on UMI1. The second block M22 detects low-amplitude gyrometer failures on UMI1.

Description of the First Block M21:

The first block has, as input data, the angular velocities of the first and second measurement channels, that is to say Va1, Vb1, Vc1 and Va2, Vb2, Vc2.

The computing principle of the first block M21 is described for the angular velocities of the two measurement channels, given along the axis a (Va1 and Va2), in the knowledge that the computations are to be reproduced identically for the angular velocities along the axis b (Vb1, Vb2) and the axis c (Vc1, Vc2).

A test is also performed on the accelerometers, for example using the same computation as described below. However, it should be noted that it is the gyrometers that quickly lead to attitude errors. For accelerometers, (threshold) monitoring of the order of a few millig (mg) is sufficient, for example 10 mg.

Since Va2 is an angular velocity provided by a medium-performance or low-performance sensor, it has a bias. In the example described, the case is taken of a low-performance sensor (gyrometer) with an estimated bias of the order of 100°/h evolving with time constants of the order of 300 s.

The first block comprises a first step of removing the bias.

The bias of Va2, denoted $B_{Va2}$, is computed by implementing a first filter FT1 on the difference between Va2 and Va1, that is to say:

$$B_{Va2}=FT1(Va2-Va1) \quad \text{[Math 1]}$$

The first filter is a low-pass filter, for example a low-pass filter with a cutoff frequency that ensures convergence of the order of 100 s.

The first block then comprises a second step of applying a second filter to the signal Zc(t) corresponding to the following difference:

$$Zc(t)=Va2(t)-Va1(t)-B_{Va2}(t-Tb) \quad \text{[Math 2]}$$

Where Tb is the bias time

The second filter FT2 is as follows, implemented over a period $\tau$:

$$FT2(t) = \frac{1}{T}\int_{t-\tau}^{t} Zc(t)\,dt = Zcf(t) \quad \text{[Math 3]}$$

It provides a filtered value of Zc(t), that is to say Zcf(t).

The bias time Tb is a time interval during which the bias of a low-performance sensor is constant. The bias time Tb has to be greater than the filtering period $\tau$. Specifically, since the filter is implemented over this period $\tau$, at least this filtering period $\tau$ is required to detect an error in the angular velocity Va1, and it is necessary for the measurement of the bias $B_{Va2}$ to be constant during this filtering period.

Drift on Va1(t) detected following the filtering expresses an attitude error equal to said drift multiplied by the filtering period. For a drift of 200°/h and a filtering period $\tau$ of 50 s, the detected error is 2.7°.

Figure 5A:
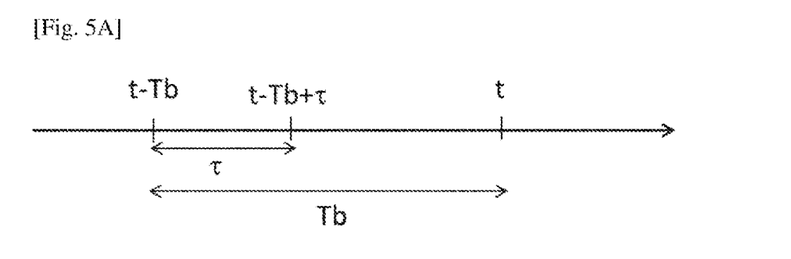

If reference is made to FIG. 5A, the bias $B_{Va2}(t)$ is computed in each computing cycle t. The signal Zc(t) is also computed based on Va1(t), Va2(t) and on the stored value of the bias at the time t−Tb, that is to say $B_{Va2}$(t−Tb). If a detectable failure occurs at the time t, it will be detected at the time t+τ. It is therefore necessary for the bias $B_{Va2}$(t−Tb) computed based on the angular velocity Va1(t−Tb) to be valid (that is to say estimated based on measurements that are not yet erroneous) from t to t+τ. Va1 therefore has to be valid between t−Tb and t−Tb+τ. It is therefore necessary for t−Tb+τ to be located before t (when the failure occurs) so that $$t-Tb+\tau < t \qquad \text{[Math4]}$$

The computation described above is therefore valid if:

$$Tb > \tau \qquad \text{[Math5]}$$

Figure 5B:
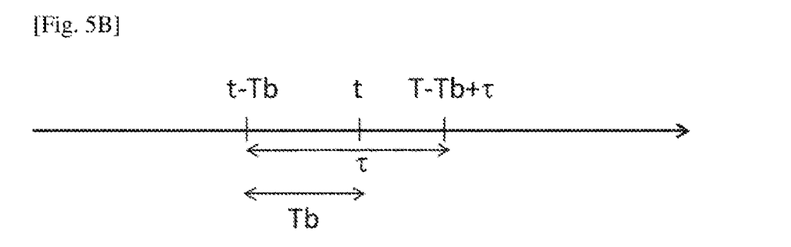
FIG. 5B illustrate two examples of temporal parameters defined in the check algorithm from FIG. 4.

If, on the other hand, the bias time is less than the filtering period, this results in the case in FIG. 5B in which the computation described above is no longer valid.

In addition, if, in the case of FIG. 5A, the bias time Tb has been chosen to be too high with respect to the effective variation of the bias, the computation described above may no longer be valid.

The filtering period τ is of the order of a few tens of seconds in order to filter out noise. It has to be less than the bias time. The larger Tb is, the more it is possible to increase the filtering value τ and therefore have an accurate detection threshold. However, the value of Tb is linked to the instabilities of the sensors of the second inertial measurement unit, which instabilities are often linked to temperature variations. Therefore, the greater the thermal inertia, the more the value of Tb may be increased.

Preferably, it is possible to add means for increasing the thermal inertia of the second inertial measurement unit. For example, it is possible to add an inertial mass to the second measurement unit or to thermally stabilize it.

Such a check algorithm is able to be implemented only if the two measurement units are mechanically fixed to one another so as to measure the same movements and the same deformations.

It is moreover necessary for the data to be as synchronous as possible in order to be able to be compared with one another effectively (ideally, the measurements should be carried out at the same time, this being difficult to achieve). In order for them to be as synchronous as possible, it is advantageous for the first and second measurement units to be in the same housing.

Preferably, a step of synchronizing the measurements between the first and second measurement units is added. For example, it is possible to synchronize the clocks of the first and second measurement units.

The first block comprises a third step of comparing Zcf(t) with a first threshold S1 in order to check whether this value is less than the threshold (in this case, it is the second block M22 described further below that checks the validity) or greater than said threshold (therefore invalid):

$$Zcf(t) = \frac{1}{\tau}\int_{t-\tau}^{t} Zc\,dt > S1 \qquad \text{[Math 6]}$$

where S1 is the first threshold expressed in °/h

S1 is for example equal to 200°/h or to a value close to 200°/h.

The first threshold also corresponds to the usage limit of the first block M21. Below this threshold, it is the second block M22 that allows the check.

Description of the Second Block M22:

The second block has Fa1, Fb1, Fc1, C1, R1, T1, Grav, Zb and possibly $F_{Coriolis}$ as input data. In the example under consideration, the vertical information Zb is a vertical position.

The second block comprises a first step of determining a vertical acceleration, computed in a terrestrial geographical reference frame, based on the inertial data of the first measurement channel (at least the specific forces and the attitudes), on the gravity determined at the position, or even on the Coriolis force. The computed vertical acceleration, denoted AccZb, is for example determined using the following formula:

$$AccZb = Tgb(C1, R1, T1) \cdot \begin{bmatrix} Fa1 \\ Fb1 \\ Fc1 \end{bmatrix} + grav - F_{Coriolis} \qquad \text{[Math 7]}$$

where Tgb(C1, R1, T1) is the rotation matrix for moving from the reference frame of the first measurement unit IMU1 to the terrestrial geographical reference frame using the three attitudes C1, R1, T1 originating from said first measurement channel.

The rotation matrix Tgb(C1, R1, T1) may be determined in the second block M22, and therefore in the check function CTR. As an alternative, it may be determined in the second computing unit CPU2 outside the check function, provided that the distribution of flow 3 is adapted accordingly.

The second block comprises a second step of comparing between the computed vertical acceleration AccZb and the vertical information Zb.

To this end, the computed vertical acceleration AccZb and the twice-derived vertical position Zb are filtered by a third low-pass filter FT3, for example a third-order low-pass filter, and compared in order to deduce a vertical bias Ba therefrom.

The Laplace transform may be used to express the filtering. The vertical bias Ba is then determined using the formula:

$$B_{Zb} = FT3(acczb - p^2 \cdot Zb) \qquad \text{[Math8]}$$

Where $p^2 \cdot Zb$ expresses the computation of the acceleration on the basis of the vertical information Zb.

In the example under consideration, Zb is a position and is therefore derived twice ($p^2$).

As an alternative, Zb may be a vertical velocity and be derived once: in this case, consideration is given to p·Zr instead of $p^2 \cdot Zr$ As an alternative, Zb may be an acceleration and, in this case, it is not derived, and consideration is given to Zr instead of $p^2 \cdot Zr$.

The third filter FT3 may be expressed as follows:

$$FT3 = \frac{G3}{p^3 + G1p^2 + G2p + G3} \qquad \text{[Math 9]}$$

The coefficients G1, G2 and G3 of the third filter make it possible to adjust the passband of said third filter.

The second block comprises a third step of comparing the vertical bias $B_{Zb}$ with a second threshold S2.

The second threshold S2 preferably takes into account:
scale factors and the bias of UMI1, the sum of which may be reduced to 350 µg; and/or
gravity anomalies, the sum of which may be set at 500 µg; and/or errors linked to the Zb measurement reduced to μg (via the dependence between altitude and variation in gravity), the sum of which may be set at 600 μg.

The second threshold S2 may thus be set at 1.5 mg. It may be set lower or higher around this value. It should be neither too low to avoid false alarms, nor too high to avoid detecting a failure or drift too late.

By way of example, if angular velocity drift d is equal to 200°/h on a sensor, leading to a roll error R1, and if it is assumed that the heading C1 and the pitch T1 are zero, then the roll error is equal to:

$$R1 = d \times t \quad \text{[Math10]}$$

Where t is the time required to detect the error.

It is also assumed that the plane is actually level, and therefore the specific forces F1 (Fa1, Fb1, Fc1) are equal to:

$$F1 = \begin{bmatrix} 0 \\ 0 \\ -grav \end{bmatrix} \quad \text{[Math 11]}$$

The computed vertical acceleration is then given by the formula:

$$AccZb = Tgb(0, d.t, 0) \cdot \begin{bmatrix} 0 \\ 0 \\ -grav \end{bmatrix} + grav \quad \text{[Math 12]}$$

And the rotation matrix is given by the formula:

$$Tgb(0, d.t, 0) = \begin{bmatrix} 1 & 0 & 0 \\ 0 & \cos(R1) & -\sin(R1) \\ 0 & \sin(R1) & \cos(R1) \end{bmatrix} \quad \text{[Math 13]}$$

Finally, it is assumed that the vertical position Zb is fixed, therefore giving:

$$p^2 \cdot Zb = 0 \quad \text{[Math14]}$$

And the velocity is zero, and therefore the Coriolis force is zero. The computed vertical acceleration is thus given by the formula:

$$AccZb = -\cos(R1)grav + grav \quad \text{[Math15]}$$

And the vertical bias is given by the formula:

$$B_{Zb} = F(-\cos(R1)grav + grav) \quad \text{[Math16]}$$

Figure 6:
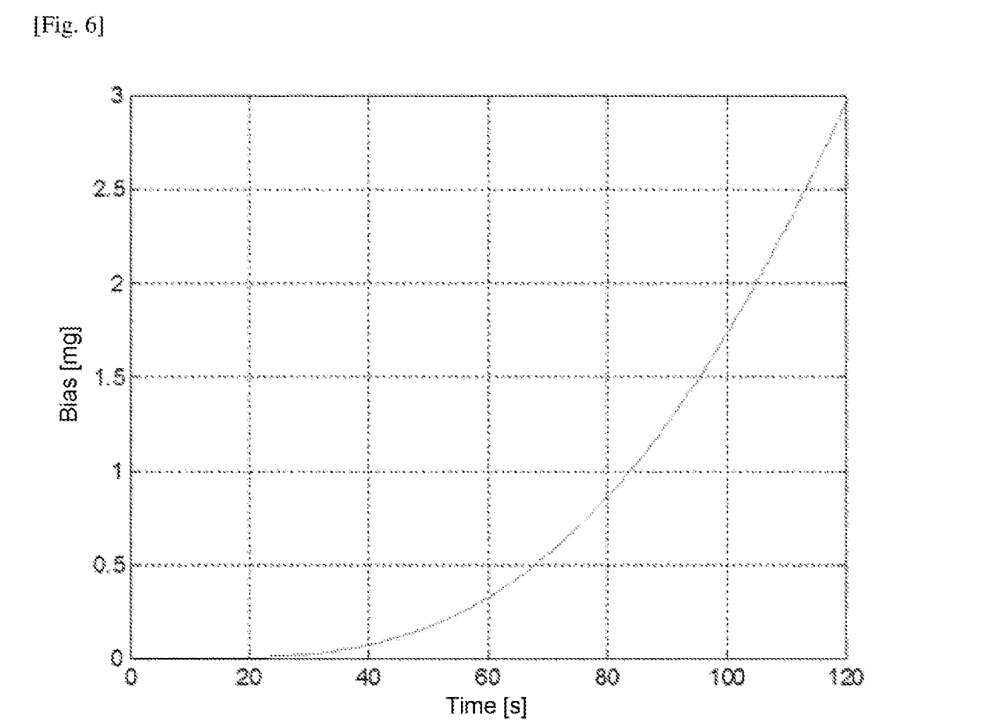
FIG. 6 is a curve depicting a vertical bias as a function of time.

If the vertical bias $B_{Zb}$ (in mg) is plotted as a function of time, this gives the curve in FIG. 6. It is seen for example that it takes approximately 95 seconds for $B_{Zb}$ to exceed 1.5 mg. After 95 seconds, the roll error will be equal to:

$$95 \times 200°/h \cong 5.3° \quad \text{[Math17]}$$

Figure 7:
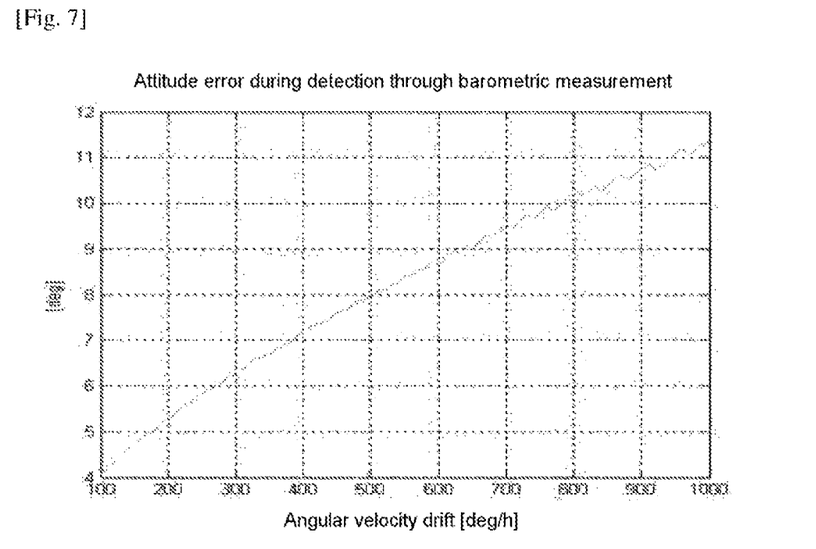
FIG. 7 is a curve depicting an attitude error at the time of detection of an angular velocity drift.

If, now with a second threshold S2 equal to 1.5 mg, the drift d of the angular velocity is varied, it is possible to determine the attitude error ("angular error") in degrees at the time of detection of the drift d ("drift error") expressed in degrees per hour, as illustrated in the curve in FIG. 7.

It may therefore be seen that, with a threshold of 1.5 mg, it is possible to detect angular velocity errors of 200°/h, leading at most to attitude errors of 5.3°.

The first and second blocks M21 and M22 of the algorithm are implemented in parallel, and they thus make it possible to detect the entire angular velocity error range, depending on whether it is less than the first threshold or greater than or equal to said first threshold.

It is furthermore possible to set certain parameters of the algorithm, such as the first threshold S1, the second threshold S2 and the filtering period τ, so as to have attitude errors on detection that do not exceed a certain attitude error limit, as has been demonstrated above (2.7° for the first block and 5.3° for the second block).

The check algorithm M2 outputs a status of integrity, non-integrity or check not done, which may be for example:
- not integral or "KO" if one of the thresholds of M21 or M22 is exceeded;
- integral or "OK" if none of the thresholds of M21 and M22 is exceeded;
- not done if the check was not able to be performed, for example if an item of data is not valid.

The check algorithm has the advantage of being simple to implement and fast. It uses information and data that are generally already present in the aircraft, while not implementing any complicated computations. As indicated above, it also makes it possible, by cleverly setting certain parameters of the algorithm, not to exceed a limit attitude error. This makes it possible to guarantee an operator that it will be possible to identify whether a failure is present before the attitude errors reach an imposed limit.

Finally, to check the computations performed by the first computing unit, the attitude computations in the current cycle of the first measurement channel will be reproduced by the second computing unit using the attitudes from the previous computing cycle and the angular velocities in the current computing cycle, all provided via flow 3. The attitudes in the current cycle of the first measurement channel will then be compared with the attitudes reproduced by the second computing channel. The comparison threshold is equal to the accuracy of the computing units of the two channels.

Description of a Second Example of a Check Algorithm

An alternative to the first example of a two-block algorithm presented above is an algorithm that computes the attitudes of the plane in the same way in the first and second computing units IP1 and IP2 based on the data provided by the first and second measurement units UMI1 and UMI2. The attitudes are then compared with a threshold, taking into account notably the asynchronism between the attitude computations. The difference in the computed attitudes is then due only to a sensor defect that it is thus possible to identify.

Such an algorithm does not require any vertical information.

It may be subject to the biases of the second measurement unit, which it is possible to remove upstream of the algorithm using a method analogous to the step of removing the bias from the first block as presented above.

However, such an algorithm has the drawback of having to develop an application for computing attitudes in the two computing units since, in general, the attitude computations performed for high-performance inertial measurement units and those performed for medium-performance and low-performance inertial measurement units are not the same.

In the two exemplary algorithms, and more generally instead of three gyrometers and three accelerometers, it is possible to use a single gyrometer and a single accelerometer in the second measurement unit UMI2 by placing the gyrometer on the trisector of the gyrometers of the first measurement unit UMI1, and the accelerometer on the trisector of the accelerometers of the first measurement unit UMI1. This makes it possible to save on sensors and allows a lower weight and bulk for the second measurement unit. One drawback is that failure of two gyrometers or two accelerometers on UMI1 may not be seen by the gyrometer or the accelerometer of UMI2. Moreover, since only a projection of the failure is seen, this generally requires raising the thresholds, resulting in a failure being detected later, and this therefore makes the check function less sensitive. Moreover, in this case, the second measurement unit is no longer able to provide inertial information as a replacement for dedicated standby equipment (IESI or Standby equipment).

The invention also relates to an avionics system for assisting the piloting and/or navigation of an aircraft, which comprises a plurality of inertial reference units according to the invention.

Figure 8:
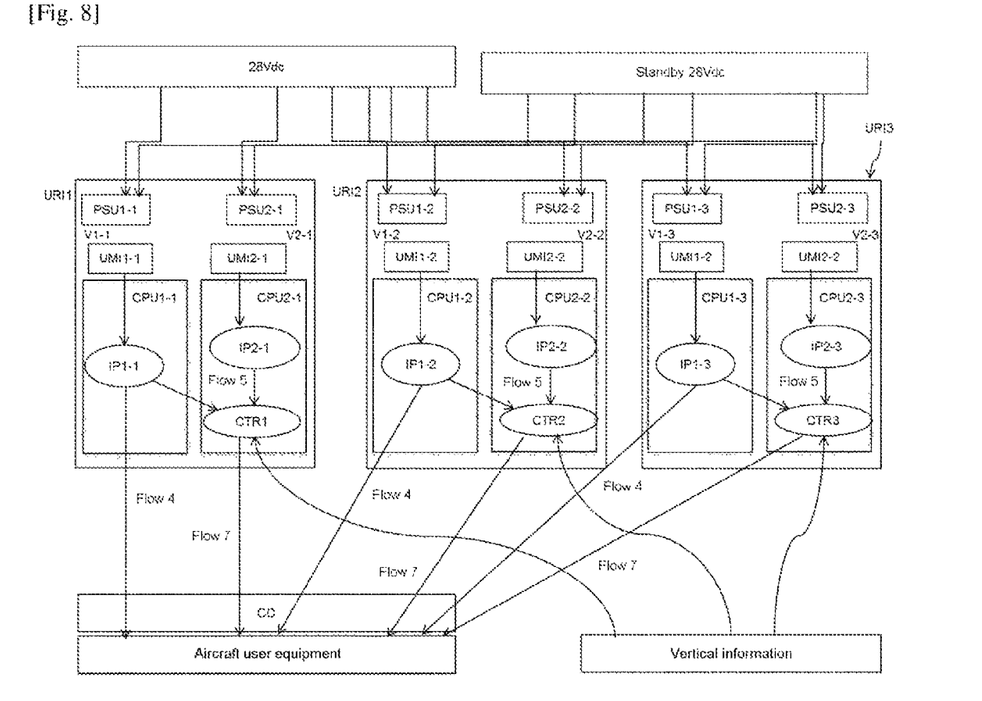
FIG. 8 illustrates a first example of an avionics system comprising three inertial reference units according to the invention.
Figure 9:
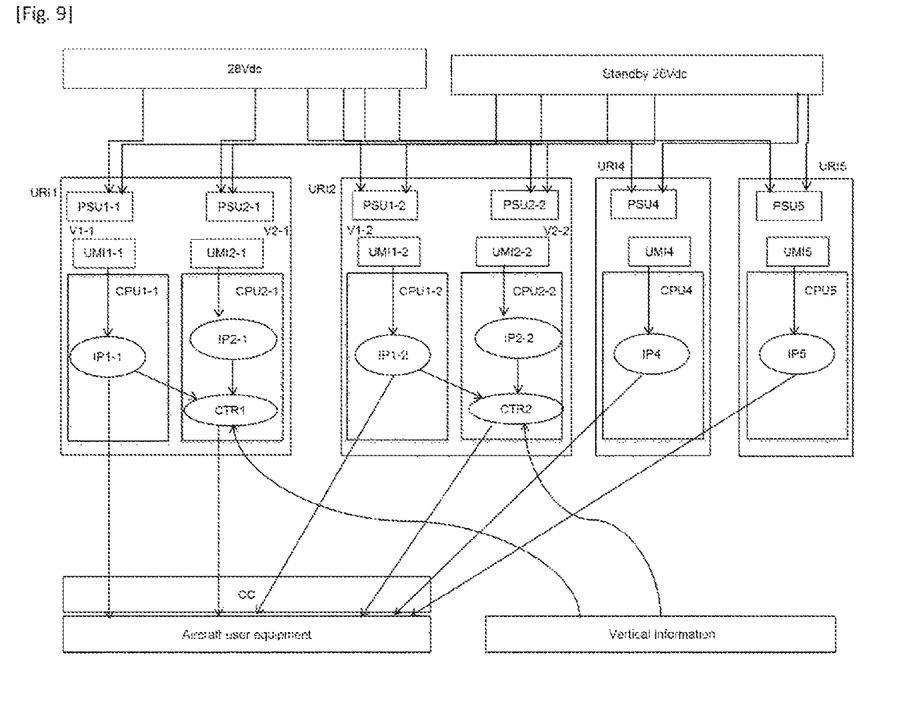
FIG. 9 illustrates a second example of an avionics system comprising two inertial reference units according to the invention and two other inertial reference units.

FIGS. 8 and 9 illustrate two examples of avionics systems comprising a plurality of inertial reference units according to the invention. In addition, comparison computations are performed between the inertial reference units of a system.

In the two exemplary avionics systems and in general, the comparison computations between the inertial reference units may be performed in one or more computers or by one or more functions within a computer. In addition, the comparison computations may be implemented either within the inertial reference units or in the system outside the inertial reference units. The advantage of performing comparison computations within the inertial reference units is that of allowing consolidation at the source. The advantage of performing the comparison computations externally is that of avoiding links between the inertial reference units, and also that of promoting the avoidance of a common-mode failure between inertial reference units that are identical to one another. In the remainder of the description (corresponding to FIGS. 8 and 9), consideration is given to a single comparison computer per system, denoted CC, arranged outside the inertial reference units.

FIG. 8 illustrates a first example of an avionics system comprising three inertial reference units according to the invention, denoted URI1, URI2, URI3, and at least one comparison computer CC.

Each inertial reference unit URI1, URI2, URI3 comprises a first measurement channel V1-1, V1-2, V1-3, which comprises:
- a first high-performance measurement unit UMI1-1, UMI1-2, UMI1-3,
- a first computing unit CPU1-1, CPU1-2, CPU1-3 comprising a first inertial processing function IP1-1, IP1-2, IP1-3;
- a first power supply unit PSU1-1, PSU1-2, PSU1-3.

Each reference unit URI1, URI2, URI3 furthermore comprises a second measurement channel V2-1, V2-2, V2-3, which comprises:
- a second medium-performance or low-performance measurement unit UMI2-1, UMI2-2, UMI2-3;
- a second computing unit CPU2-1, CPU2-2, CPU2-3 comprising a second inertial processing function IP2-1, IP2-2, IP2-3;
- an integrity check function CTR1, CTR2, CTR3;
- a second power supply unit PSU2-1, PSU2-2, PSU2-3.

Each reference unit furthermore comprises provision means for providing vertical information to the integrity check function.

The attitudes provided by the first computing units (in flows 4) are denoted C11, R11 and T11 for URI1; C12, R12 and T12 for URI2; and C13, R13 and T13 for URI3. All the data are provided with their validity and a CRC.

The attitudes provided by the second computing units (in flows 5) are denoted C21, R21 and T21 for URI1; C22, R22 and T22 for URI2; and C23, R23 and T23 for URI3. All the data are provided with their validity and a CRC.

Flows 7 contain the data from flows 4 and 5 and the status of the check function (consolidation status). Flows 4 and 7 are directed to user equipment of the aircraft.

A user equipment item may be electric flight controls, an autopilot, a flight management system, a cockpit display, or another inertial reference unit, etc.

When the three inertial reference units are available, the comparison computer CC performs a mutual comparison ("cross-check") between the attitude data, specifically the heading data C11, C12 and C13, the roll data R11, R12 and R13, and the pitch data T11, T12 and T13. This is enough to determine whether an inertial reference unit has failed (assuming a single failure).

The cross-check is preferably performed using a plurality of comparison computers in order to ensure redundancy.

One example of a cross-check is described below, considering heading, in the knowledge that it is also used for roll and pitch (the defined thresholds will not necessarily be the same). The heading data provided by the three inertial reference units URI1, URI2, URI3 (data via the first measurement channels, that is to say high-performance ones) are thus compared with one another, and it is checked whether one of the series of following inequalities is present.

$$|C1j-C1kj|<S_C \text{ and } |C1j-C1ij|>S_C \text{ and } |C1k-C1ij|>S_C \quad [\text{Math.18}]$$

Where i, j and k have different values from one another, and may each be equal to 1, 2 or 3, and where $S_C$ is the threshold for the heading.

In the case indicated in the formula Math. 18, the data from $URI_i$ are invalidated at output.

When only two inertial reference units are available, it is still possible to detect a failure by consolidating the data from the two available units, but it is no longer known how to vote in order to determine which one has failed. In this case, it is possible to use one or more of the check functions CTR1, CTR2, CTR3 in order to determine which inertial reference unit has failed. In the worst-case scenario, control is returned to the pilot (direct mode), who may use the outputs computed from a second inertial measurement unit UMI2-1, UMI2-2, UMI2-3.

FIG. 9 illustrates a second example of an avionics system comprising two inertial reference units URI1 and URI2 according to the invention and two inertial reference units URI4 and URI5 of different design. There are thus two pairs of dissimilar inertial reference units, thereby avoiding common-mode failures between them.

The attitudes C11, R11, T11 and C12, R12, T12 coming from the two inertial reference units URI1 and URI2 according to the invention are compared with the attitudes C4, R4, T4 and C5, R5, T5 coming from the other two inertial reference units URI4 and URI5, with for example the same computation as for the first exemplary system.

In the event of inconsistency on one of the two types of inertial reference unit, the data from the type of inertial reference unit that does not exhibit any inconsistency are used.

In the event of inconsistency for both types, it is possible to use one or more of the check functions CTR1, CTR2 in order to determine which inertial reference unit according to the invention has failed.

Unless indicated otherwise, the various embodiments may be combined with one another.

In addition, it should be understood that other embodiments may be used, and notably that logical modifications may be made. Furthermore, unless indicated otherwise, the embodiments presented in the detailed description of the invention should not be interpreted as limiting the order of the steps.

The invention is applicable in civil aviation.

The invention claimed is:

1. An inertial reference unit (URI) for providing and monitoring flight parameters of an aircraft, comprising:
   a first measurement channel (V1) comprising:
      a first high-performance inertial measurement unit (UMI1) comprising first measurement means for measuring specific forces and first measurement means for measuring angular velocities, and
      a first computing unit (CPU1) coupled to the first high-performance inertial measurement unit (UMI1) and comprising a first inertial processing function (IP1) able to compute pure inertial data based on measurements of said first high-performance inertial measurement unit;
   a second measurement channel (V2) comprising:
      a second inertial measurement unit (UMI2) of performance lower than the first high-performance inertial measurement unit (UMI1) and comprising second measurement means for measuring specific forces and second measurement means for measuring angular velocities, and
      a second computing unit (CPU2) coupled to the second inertial measurement unit (UM12) and comprising a second inertial processing module (IP2) able to compute pure inertial data based on measurements of said second inertial measurement unit;
   an integrity check function (CTR) able to implement a method for checking an integrity of data of the first measurement channel (VI) based on the data provided by the second measurement channel (V2);
   a synchronization means for synchronizing the measurements of the first high-performance inertial measurement unit (UMI1) and the second inertial measurement unit; and
   the first high-performance inertial measurement unit (UMI1) and the second inertial measurement unit being mechanically mounted fixedly with one another in the inertial reference unit (URI).

2. The inertial reference unit as claimed in claim 1, furthermore comprising provision means for providing vertical information to the integrity check function (CTR), said integrity check function (CTR) being able to implement a method for checking the integrity of the data of the first measurement channel (V1) based on the data provided by the second measurement channel (V2) and on said vertical information.

3. The inertial reference unit as claimed in claim 2, wherein the vertical information that is provided being a vertical position, a vertical velocity or a vertical acceleration.

4. The inertial reference unit as claimed in claim 1, wherein the second inertial measurement unit (UMI2) being of medium or low performance.

5. The inertial reference unit as claimed in claim 1, wherein the first and second measurement means for measuring specific forces comprising accelerometers.

6. The inertial reference unit as claimed in claim 1, wherein the first and second measurement means for measuring angular velocities comprising gyrometers.

7. The inertial reference unit as claimed in claim 1, wherein the first measurement channel (V1) furthermore comprising a first power supply unit (PSU1) and the second measurement channel (V2) furthermore comprising a second power supply unit (PSU2).

8. A method for checking the integrity of the first measurement channel (V1) of a chosen inertial reference unit (URI) as claimed in claim 1, said method being implemented in the integrity check function (CTR) for checking the integrity of said inertial reference unit and comprising the following steps:
   a first step of providing a consolidated item of inertial data originating from the second measurement channel (V2);
   a second step of determining a first comparison value between an item of inertial data originating from the first measurement channel (V1) and a consolidated item of inertial data originating from the second measurement channel (V2); and
   a third step of comparing the first comparison value with a first threshold (S1), a value greater than said first threshold making it possible to detect a lack of integrity.

9. The method as claimed in claim 8, furthermore comprising a step of synchronizing the measurements between the first and second measurement units of the inertial reference unit.

10. The method as claimed in claim 8, furthermore comprising a preliminary self-monitoring step in static alignment mode of the first inertial measurement unit and/or of the second inertial measurement unit.

11. The method as claimed in claim 8, wherein the first step comprising a step of correcting the item of inertial data originating from the second measurement channel (V2) so as to obtain a consolidated item of inertial data.

12. The method as claimed in claim 11, wherein the correction step being performed using an item of inertial data originating from the first measurement channel (V1) by applying a first filter (FT1) to a difference between the item of inertial data originating from the second measurement channel (V2) and the item of inertial data originating from the first measurement channel (V1), said correction step being offset in time from the second determination step.

13. The method as claimed in claim 11, wherein the correction step comprising a step of removing a bias from the item of inertial data originating from the second measurement channel (V2), said bias being constant for a given bias time (Tb), the second step being performed in said bias time (Tb).

14. The method as claimed in claim 13, wherein the first comparison value being obtained by applying a second filter (FT2) to a difference between the corrected item of inertial data originating from the second measurement channel (V2) and the item of inertial data originating from the first measurement channel (V1), a period of the filter (T) being less than the bias time (Tb); and
   the third step consisting in comparing a result of the second filter (FT2) with the first threshold (S1).

15. The method as claimed in claim 9, wherein the compared items of inertial data being attitude, angular velocity, specific force and/or acceleration data.

16. The method as claimed in claim 9, comprising:
   a fourth step of determining a second comparison value between a vertical acceleration computed based on inertial data originating from the first measurement channel (V1) and vertical information provided to the integrity check function (CTR), the vertical information being a measured vertical position or a measured vertical velocity, said vertical information being transformed beforehand into vertical acceleration or a measured vertical acceleration; and a fifth step of comparing the second comparison value with a second threshold (S2), a value greater than said second threshold making it possible to detect a lack of integrity.

17. The method as claimed in claim 16, wherein the second comparison value being obtained by applying a third filter (FT3) to a difference between the computed vertical acceleration and the vertical acceleration resulting from the vertical information;

and the fifth step of comparing consisting in comparing the result of the third filter (FT3) with the second threshold (S2).

18. An avionics system for assisting a piloting and/or navigation of an aircraft, comprising at least two chosen inertial reference units (URI1, URI2) as claimed in claim 1, and at least one comparison computer (CC) able to compare an item of inertial data delivered by a first inertial reference unit and an item of inertial data delivered by a second inertial reference unit.

19. The system as claimed in claim 18, comprising three chosen inertial reference units (URI1, URI2, URI3).

20. The system as claimed in claim 18, comprising two chosen inertial reference units (URI1, URI2) and two other inertial reference units (URI4, URI5).

21. The system as claimed in claim 18, comprising a measurement means for measuring vertical information a barometric altimeter, a radio altimeter, a vertical accelerometer, and/or a vertical velocity probe.

22. A method for checking the integrity of an avionics system for assisting a piloting and/or navigation of an aircraft, comprising at least two chosen inertial reference units (URI1, URI2) as claimed in claim 1, comprising at least one comparison computer (CC) able to compare an item of inertial data delivered by a first inertial reference unit and an item of inertial data delivered by a second inertial reference unit the method further comprising:

a first step of comparing an item of inertial data delivered by a first inertial reference unit and an item of inertial data delivered by a second inertial reference unit, so as to determine a failure of an inertial reference unit; and, if the first step does not make it possible to discriminate the failed inertial reference unit, a second step of implementing a method for checking the integrity of the first measurement channel (V1) of a chosen inertial reference unit (URI) as claimed in claim 1, said method being implemented in the integrity check function (CTR) for checking the integrity of said inertial reference unit and comprising the following steps for at least one inertial reference unit as claimed in claim 1:

a first step of providing a consolidated item of inertial data originating from the second measurement channel (V2);

a second step of determining a first comparison value between an item of inertial data originating from the first measurement channel (V1) and a consolidated item of inertial data originating from the second measurement channel (V2); and a third step of comparing the first comparison value with a first threshold (S1), a value greater than said first threshold making it possible to detect a lack of integrity.

* * * * *

UNITED STATES PATENT AND TRADEMARK OFFICE
CERTIFICATE OF CORRECTION

| | |
|---|---|
| PATENT NO. | : 12,098,922 B2 |
| APPLICATION NO. | : 17/600573 |
| DATED | : September 24, 2024 |
| INVENTOR(S) | : Jacques Coatantiec et al. |

It is certified that error appears in the above-identified patent and that said Letters Patent is hereby corrected as shown below:

In the Claims

In Claim 14, Column 22, Line 55, "a period of the filter (T) being less than" should be -- a period of the filter ($\tau$) being less than --.

Signed and Sealed this
Fifth Day of November, 2024

Katherine Kelly Vidal
*Director of the United States Patent and Trademark Office*